United States Patent [19]

Shiozawa et al.

[11] Patent Number: 4,977,041
[45] Date of Patent: Dec. 11, 1990

[54] FUEL CELL AND METHOD OF AMELIORATING TEMPERATURE DISTRIBUTION THEREOF

[75] Inventors: Shoji Shiozawa, Yokohama; Toru Shimizu, Urawa, both of Japan

[73] Assignee: Ishikawajima-Harima Heavy Industries Co., Ltd., Tokyo, Japan

[21] Appl. No.: 273,888

[22] Filed: Nov. 21, 1988

[51] Int. Cl.$^5$ ............................................. H02M 8/04
[52] U.S. Cl. ........................................ 429/26; 429/34
[58] Field of Search .................................... 429/26, 34

[56] References Cited

U.S. PATENT DOCUMENTS

| | | | |
|---|---|---|---|
| 3,994,748 | 11/1976 | Kunz et al. | 429/34 X |
| 4,582,765 | 4/1986 | Kothmann | 429/26 X |
| 4,766,043 | 8/1988 | Shirogami et al. | 429/34 X |
| 4,769,298 | 9/1988 | Hosaka | 429/26 X |

Primary Examiner—Stephen J. Kalafut
Attorney, Agent, or Firm—R. A. Blackstone, Jr.

[57] ABSTRACT

Cell elements, each of which includes electrolyte plate such as fused carbonate, an anode plate and a cathode plate, and separator plates provided with heat transfer assisting means are piled up one after the other. Oxidizer gas supplied to one separator plate flows in the direction opposite to the oxidizer gas supplied to an adjacent separator plate, so that heat propagates easily in the direction the cell elements and the separator plates are piled up through the heat transfer assisting means, making the temperature profile of the fuel cell more gentle.

40 Claims, 8 Drawing Sheets

FUEL CELL AND METHOD OF AMELIORATING TEMPERATURE DISTRIBUTION THEREOF

BACKGROUND OF THE INVENTION

1. Technical Field

The present invention relates to a fuel cell which causes fuel gas and gaseous oxidizer to react with each other therein so as to produce electricity. More particularly, it is concerned with a fuel cell which is constituted by stacking cell elements and separators one after the other, and a method of ameliorating temperature distribution of the fuel cell, each cell element being constituted by sandwiching an electrolyte such as fused carbonate by two electrode plates, and the fuel gas and the oxidizer being supplied through the separators.

2. Background Art

The principle of the fuel cell is as follows: hydrogen of the fuel gas and oxygen of the oxidizer are chemically reacted with each other with use of electrolyte, thereby producing electricity and water. This is the reversal of the electrodialysis of water. Major components of the fuel cell are cell elements, each of which elements includes an electrolyte plate, a porous anode plate and a porous cathode plate, with the electrolyte plate being sandwiched by the anode and the cathode plates. Electricity is generated by supplying the fuel gas to the anode side while supplying the oxidizer to the cathode side.

Herebefore phosphoric acid or fused carbonate was employed as the electrolyte of the fuel cell.

Reactions at the anode and the cathode plates, when the fused carbonate is utilized as the electrolyte, are as follows:

Cathode: 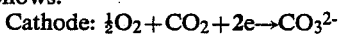
Anode: 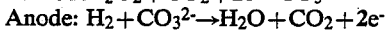

In the conventional fuel cell, the cell elements and the separtor plates are piled up alternately, making plural stages, and the fuel gas and the gaseous oxidizer are supplied to each cell element in a manner such that those gases flow along the upper and lower faces of the separator plate from one side of the separator plate to the other side thereof.

Meanwhile, since heat is produced upon generation of electricity in the fuel cell, certain measure has to be taken for elimination of such heat. Heat elimination, or cooling can be carried out by certain cooling means, or by continuous supply of fuel gas and oxidizer gas so that the previously supplied fuel gas and oxidizer and the fuel cell system may be cooled by the following gases. Gases introduced in a passage formed within the separator plate cool the cell element by receiving heat from the cell element as well as the separator plate until they reach the exit of the passage. In such a cooling, however, temperature distribution along the cell element face is not gentle, creating a considerable temperature difference of as large as three hundred degrees C. between the highest and the lowest temperature points thereof.

Such a large undulation in temperature profile along the cell element surface results in nonuniform current density, which in turn leads to deterioration of power generation efficiency of the fuel cell. Also, a sharp inclination in temperature distribution reduces longevity of the cell element and the separator.

SUMMARY OF THE INVENTION

One object of the present invention is to provide a fuel cell whose temperature distributions have less ups and downs all over the surface of the cell elements as well as the separators.

Another object of the present invention is to provide a fuel cell including plural separators, each of which separators possesses oxidizer gas passages on one face thereof in such fashion that the gaseous oxidizer flowing through one separator moves in the counter direction relative to the oxidizer flowing through the next separator.

Still another object of the present invention is to provide a fuel cell whose separator has novel construction so that thermal exchange in the direction the cell elements and the separator plates are piled up are improved, whereby temperature profile of the cell element may be symmetrical with only small fall and rise.

Yet another object of the present invention is to provide a method of reducing the ups and downs in the temperature distribution all over the surfaces of the cell elements and the separators.

According to one aspect of the present invention there is provided a fuel cell which comprises: a cell element including an electrolyte plate, an anode plate and a cathode plate, the electrolyte being sandwiched by the anode and the cathode plates; a separator plate which possesses passages formed on the front and back faces thereof so as to supply fuel gas o the anode plate of the cell element while supplying gaseous oxidizer to the cathode plate, the cell element and the separator plate being piled up one after the other, building plural stages, characterized in that said fuel cell further comprises means for supplying/discharging the oxidizer gas o/from the oxidizer gas passages formed on one face of each separator plate in a manner such that the oxidizer gas of one separator may flow in the counter direction the oxidizer gas of the adjacent separator plate: and heat transfer assisting means disposed on the front and back faces of each separator so as to assist the heat transfer between he oxidizer gas and the fuel gas in the direction the separator plates and the cell elements are stacked.

These and objects, aspects and advantages of the present invention will be more fully understood by reference to the following detailed description taken in conjuction with the various figures and appended claims.

BRIEF DESCRIPTION OF THE DRAWINGS

The drawings form an integral part of the description of the preferred embodiment and are to be read in conjuction therewith.

DESCRIPTION OF THE PREFERRED EMBODIMENTS

Figure 1:
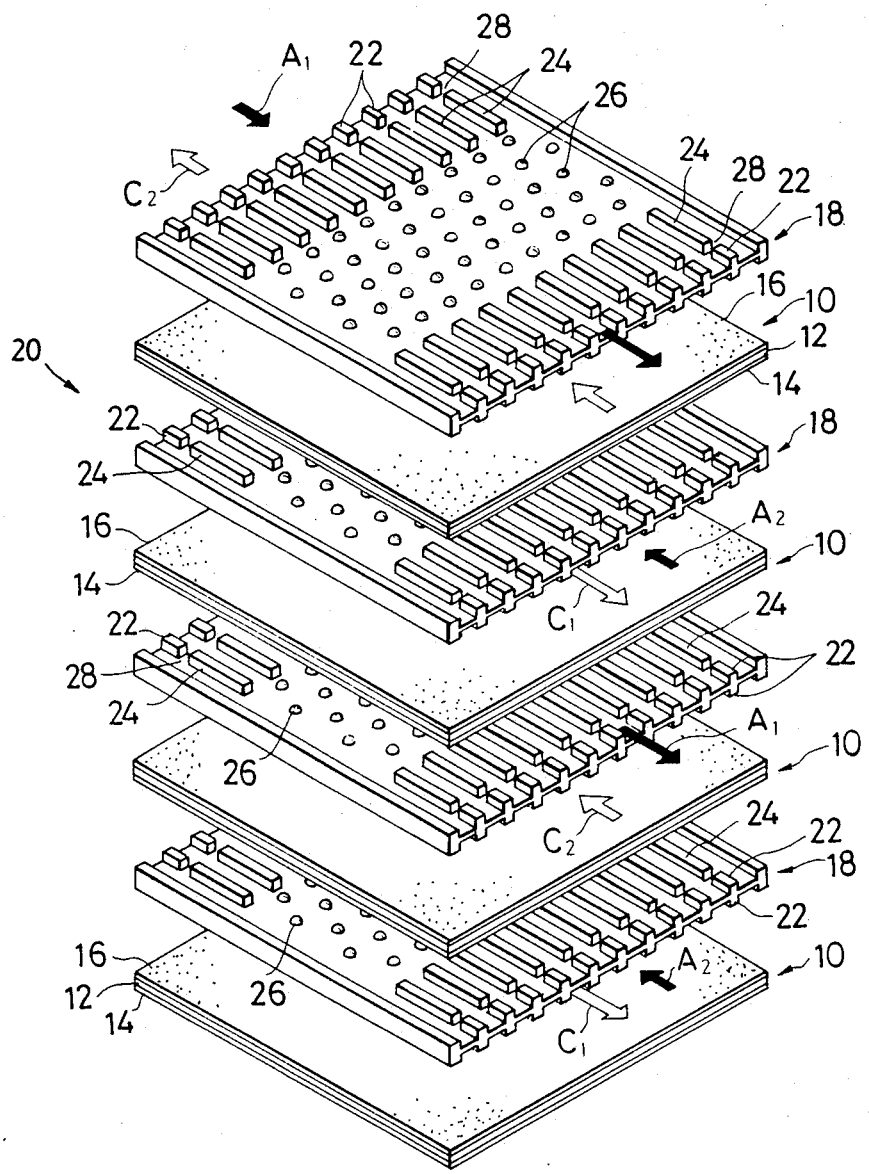
FIG. 1 is a perspective view showing a fundamental arrangement of a fuel cell according to the present invention.

Now referring to FIG. 1 of the accompanying drawings, a basic construction of a fuel cell of the present invention will be described. Reference numeral 10 designates a cell element, which is composed of an electrolyte plate 12 made from fused carbonate, phosphoric acid, or the like, and an anode plate 14 and a cathode plate 16, with the electrolyte plate being located between the anode plate and the cathode plate. Numeral 18 denotes a separator plate through which fuel gas such as hydrogen is supplied to the anode plate 14 and gaseous oxidizer such as air is supplied to the cathode plate 16.

The cell elements 10 and the separator plates 18 are piled up one after the other, creating multiple stages as a body 20 of the fuel cell. In piling, each cell element 10 is arranged in a manner such that he cathode plate 16 may become a front face or an upper face while the anode plate 14 a back face or a lower face, and such that fuel gas passages A1 and A2 may be formed between the anode plate 14 and the upper face of the separator plate 18, as indicated by shaded arrows in FIG. 1 while oxidizer gas passages C1 and C2 may be formed between the cathode plate 16 and the lower face of the separator 18 as indicated by unshaded arrows C1 and C2.

The oxidizer gas passages C1 and C2 are formed such that the oxidizer supplied to one separator plate may flow in the counter direction relative to the oxidizer gas supplied to adjacent separator plates as indicated by C1 and C2. As for one cell element 10, the oxidizer gas and the fuel gas flow in the same direction, which is referred to as "co-flow", as indicated by C2 and A2, or C1 and A1. As for one separator plate the fuel gas supplied to one face thereof flows in the counter direction against the oxidizer gas supplied to the other face thereof as indicated by A1 and C2, or A2 and C1.

On the top face as well as the bottom face of each separator plate 18, there are formed near the entrance add the exit of the passage block-like projections or fins 22 and 24 which extend parallel to each other in the direction the supplied gases flow, and small semispherical projections 26 therebetween. Among these fins 22 and 24, the outermost fins 24 are made relatively short, and the fins 24 thereinside are spaced from the outermost fins 22 by clearance 28 and made relatively long. These fins 22 and 24 are formed such that they occupy approximately half the separator plate surface from the entrance and exit side, with one-fourth being occupied from each side. Another half of the separator plate surface is occuppied by the small semispherical projections 26 provided between the fins 24. The block-shaped fins 22 and 24 contact with corresponding anode plate 14 and cathode plate 16 of the cell elements 10 as the cell elements 10 and the separator plates 18 are stacked, so that the heat transfer between the anode plate 14 and the cathode plate 16 are improved. So is that between cathode plates of the adjacent cell elements.

Figure 2:
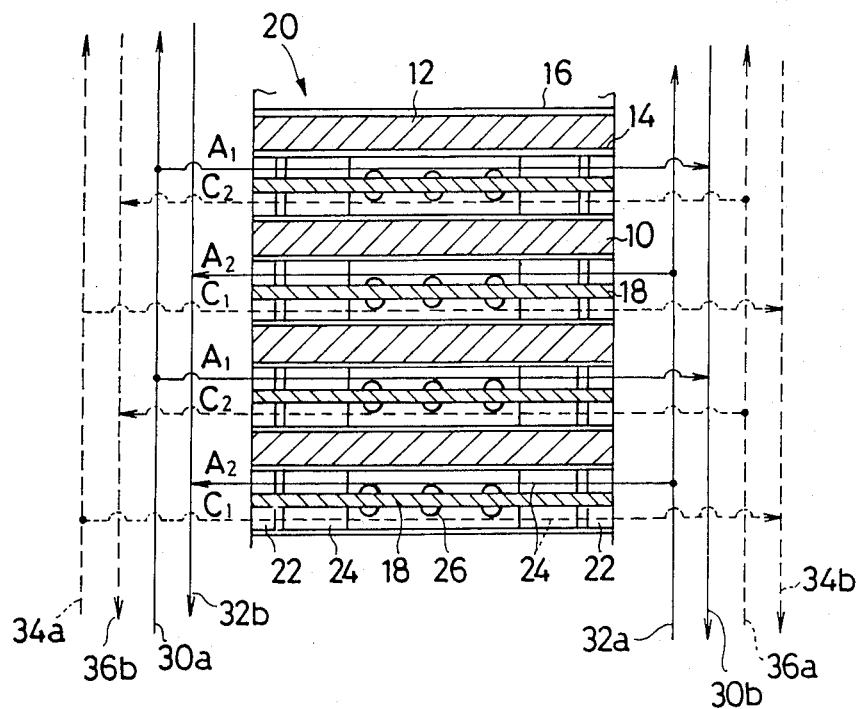
FIG. 2 is a schematic view to explain supply and discharge of the fuel gas and the oxidizer to separator plates which are stacked on cell elements one after the other.

Referring now to FIG. 2, the anode side passages A1 and A2 of adjacent separators 18 are connected to fuel gas supply passages 30a and 32a and fuel gas discharge passages 30b and 32b respectively, while the cathode side passages C1 and C2 are communicated with oxidizer gas supply passages 34a and 36a, and oxidizer gas discharge passages 34b and 36b respectively, so that the fuel gas and the oxidizer gas may flow in the opposite directions along the top face and the bottom face of each separator plate respectivelY, and that C1 and C2 may be directed in directions opposite to each other.

As the fuel gas is fed to the anode plate 14 and the oxidizer gases is fed to the cathode plate 16 of each cell element 10, the gases so fed react with each other via the electrolyte 12, generating electrical energy, as illustrated in FIGS. 1 and 2.

Each cell element and separator plate 18 are electrically connected to each other, whereby electric power can be drawn from the uppermost cathode plate 16 and the lowermost anode plate 14 of the fuel cell body 20.

During generation of the electric power, the oxidizer gas is supplied 10 to 20 times as much s the fuel gas. If the oxidizer gas temperature at the entrance of the passage is 550° C., the same rises to 750° C., which is very influential to the temperature profile of the cell element. In this particular embodiment, since he oxidizer gas passages C1 an C2 are directed in the opposite direction respectively, and the fins 22 and 24 are provided near the entrances and the exits of those passages, mainly, heat of the oxidizer gas is transmitted in the direction of the piling near the block-like fins 22 and 24. In other words, since these fins 22 and 24 serve to assist the heat transmission between adjacent cell elements 10, particularly between oxidizer gases flowing through C1 and C2, the temperature difference between the entrance and the exit of each cell element 10 is reduced, shaping the temperature distribution curve rather flat in the direction the gases flow in.

Figure 3:
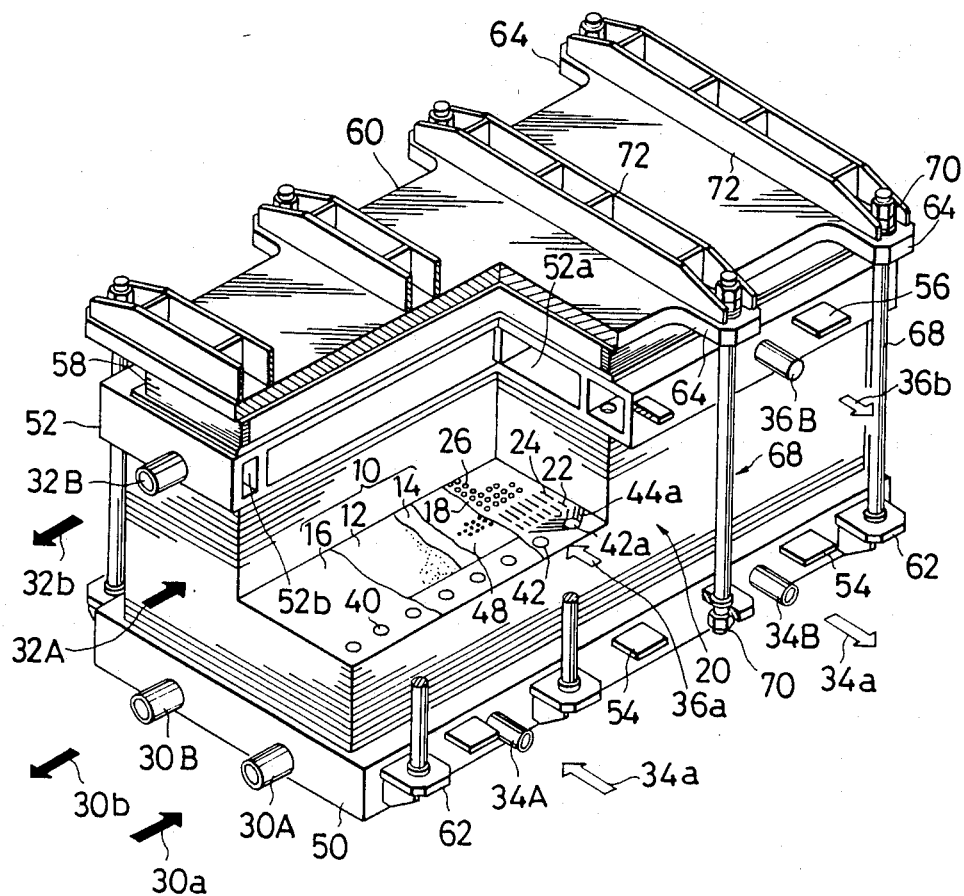
FIG. 3 is a partial sectional perspective view depicting an entire fuel cell system of the present invention.
Figure 4:
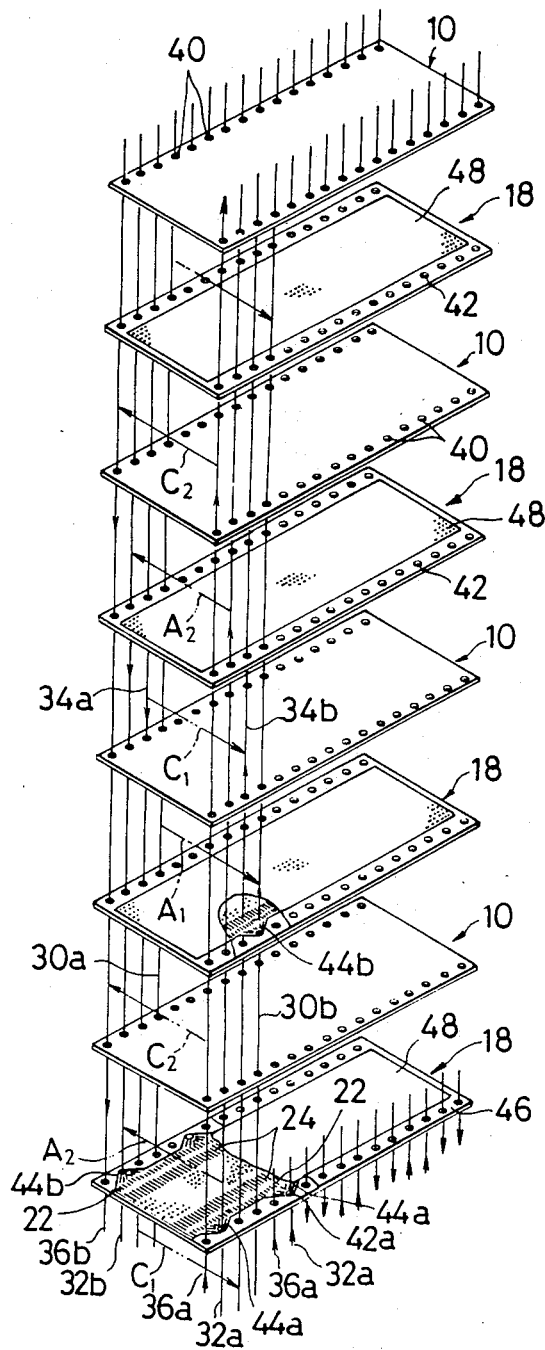
FIG. 4 is a perspective view depicting the details of the cell elements and the separator plates of FIG. 3 as they are stacked one after the other.

FIGS. 3 to 6 illustrate more detailed view of construction of the fuel cell according to the present invention. The cell element 10 and the separator plate are shaped rectangular, as shown in FIG. 4. A large number of small openings 40 and 42, which serve as the supply passage 30a, 32a, 34a and 36a, and the discharge passage 30b, 32b, 34b and 36b of FIG. 2, are formed with equal intervals within the plate 10 along the both longer lateral sides thereof. The cell element 10 is constituted by sandwiching the electrolyte 12 by the anode plate 14 and the cathode plate 16. The openings 40 for supplying/discharging the gases are formed in the anode plate 14 as well as the cathode plate 16.

Figure 5:
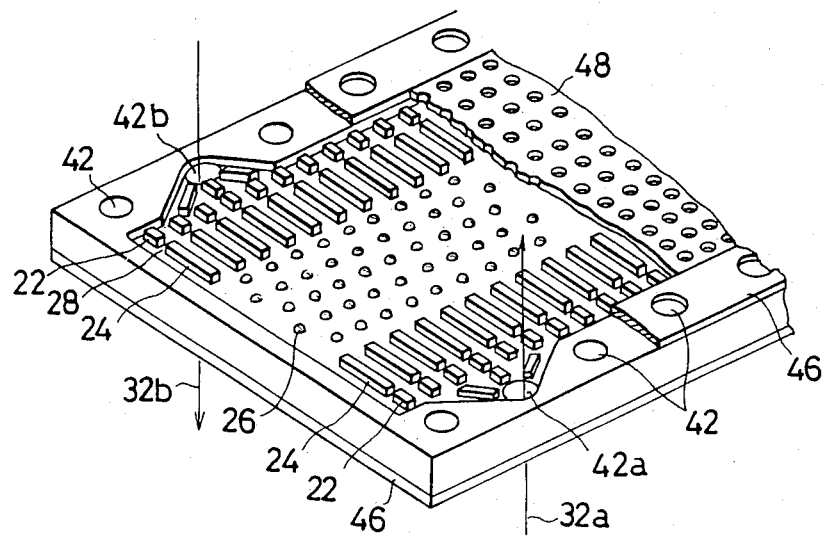
FIG. 5 is a partial enlarged view of the separator plate.
Figure 6:
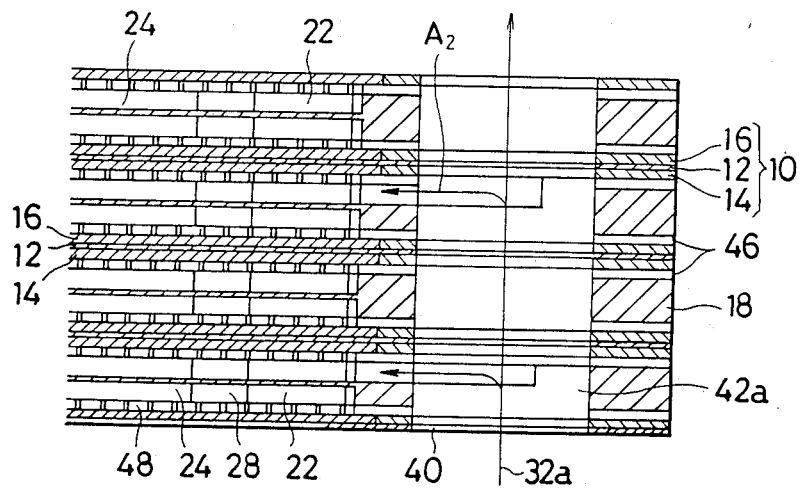
FIG. 6 is a partical enlarged view to explain the gases fed through the gas passages to the separator plates as the cell elements and the separator plates are stacked.

The pores 42 of the separator plate 18 are provided with distributors 44a and 44b which allow the pores 44a and 44b to communicate with the corresponding passages A1, A2. C1 and C2 so that the fuel gases and the oxidizer ay be introduced to the passages A1, A2, and C2 formed on the upper and lower faces of the separator 18. In clearer terms, as illustrated in FIGS. 5 and 6, if the fuel gases are desired to be supplied to the anode side gas passage A2 of the separator plate 18, an entrance distributor 44a is provided to the fuel gas supply passage 32a, and an exit distributor 44b is provided to the discharge passage 32b. For example when there is provided a four channel supply/discharge line for the fuel gas and oxidizer, four distributors 44a/44b are provided along the pores 42 on either side of the separator plate 18.

Sealing frames 46 for securing a tight seal with the cell element 10 are respectively mounted on the upper and lower faces of the separator plate 18, and a punching metal 48 is provided inside the sealing frame 46 such that heat may be transferred well between two adjacent cell elements through the projecting fins 22 and 24 of the separator plate 18 and the punching metal 48 while allowing the supplied gases to pass through the passages.

Assembling of the above described fuel cell system including the cell elements 10 and the separator plates 18, being piled up one after the other, will be explained with FIG. 3.

On the bottom holder 50, a fuel cell body 20, which is a laminated body of plural cell elements 10 and the separator plates 18, is located, and a top holder 52 is placed on the top face of the laminated body 20. In the bottom and top holders 50 and 52, entrance and exit ports 30A, 32A, 34A, 36A, 30B, 32B, 34B, and 36B are formed, which are respectively connected to the gas supply passage 30a, 32a, 34a, 36a and the discharge passage 30b, 32b, 34b, 36b. To connect these entrance and exit ports to each other, paths 52a and 52b are formed within the holders 50 and 52. Terminals for taking out electric current. 54 and 56 are also provided to the lower and upper holders 50 and 52.

A presser plate 60 is disposed on the upper holer 52 via a bellows 58. Lugs 62 and 64 project from the lower holder 50 and the presser plate 60 respectively at corresponding positions thereof, and each pair of lugs 62 and 64 are joined by a rod 68 and nuts 70. Reinforcement members 72 are integrally provided to the presser plate 60 so as to span every two lugs 64 in the width direction of the fuel cell body.

According to the fuel cell constructed in the above manner, when the power generation temperature is set to 650 degrees C., fuel gas, such as hydrogen, of approximately 500 degrees C. has to be supplied to the inlet port 30A and 32A. The fuel gas is, for example, hydrogen-rich gas which is obtained by reforming natural gas with steam by a reformer. Oxidant gas of approximately 400 degrees C. is fed to the inlets 34A and 36A. The oxidizer gas is supplied preferablY between ten and twenty times as much as the fuel gas.

Upon power generation, steam and $CO_2$ are expelled from the fuel gas exit 30B and 32B while residual gases are exhausted from the oxidant gas exit 34B and 36B.

Figure 7:
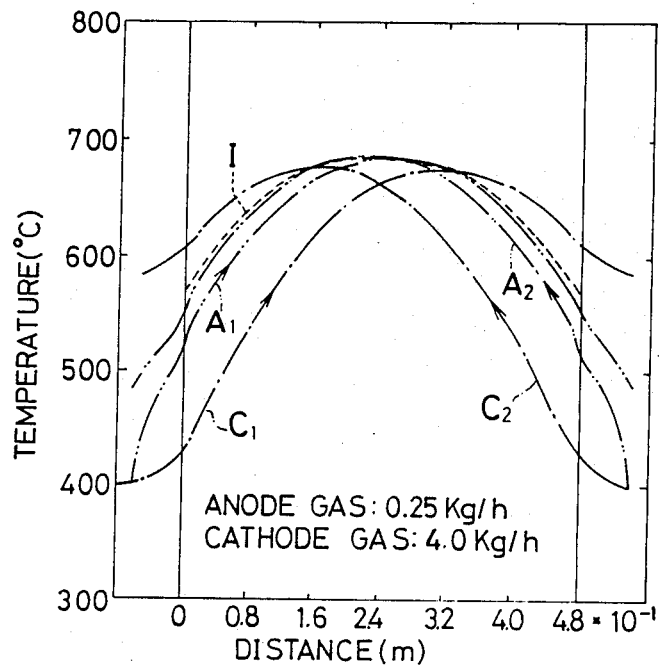
FIG. 7 is a diagram showing temperature distribution of the gases flowing along the front and back faces of adjacent separator plates and the cell element with the horizontal axis being a distance measured in the direction the gas flows.

Referring now to FIG. 7, A1 and A2 indicate fuel gas temperature, C1 and C2 indicate oxidant gas temperature, and I indicates cell element temperature in the direction the respective gases flow.

According to the present invention, since the fins 22 and 24 which serve as thermal transfer assisting means are provided near the entrances and the exits of the separator plate, heat propagation between the oxidizer gas flowing through C1 and C2, which is influential to the temperature distribution, is promoted, whererby the undulation of the cell element tempera u e profile I becomes more gentle, namely the temperature range is reduced to as small as about one hundred degrees with symmetrical configuration.

Figure 10:
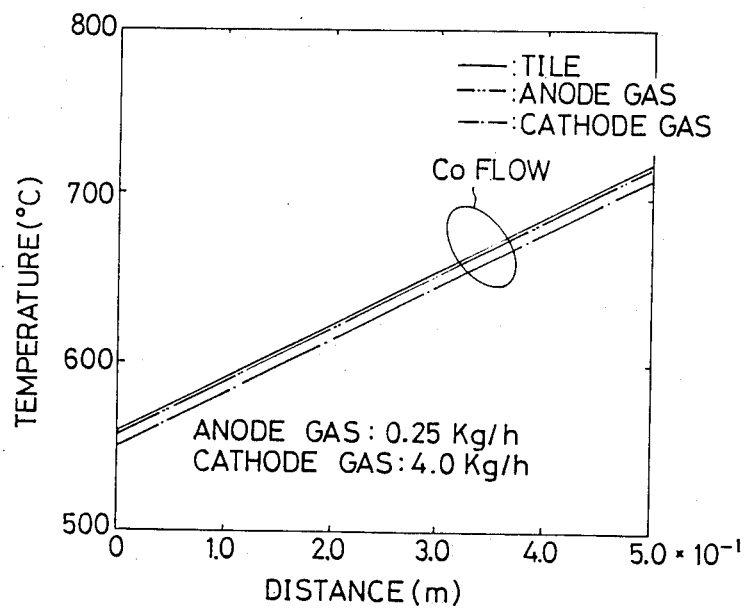
FIG. 10 shows temperature distribution of a conventional fuel cell for comparison with FIG. 7.
Figure 8:
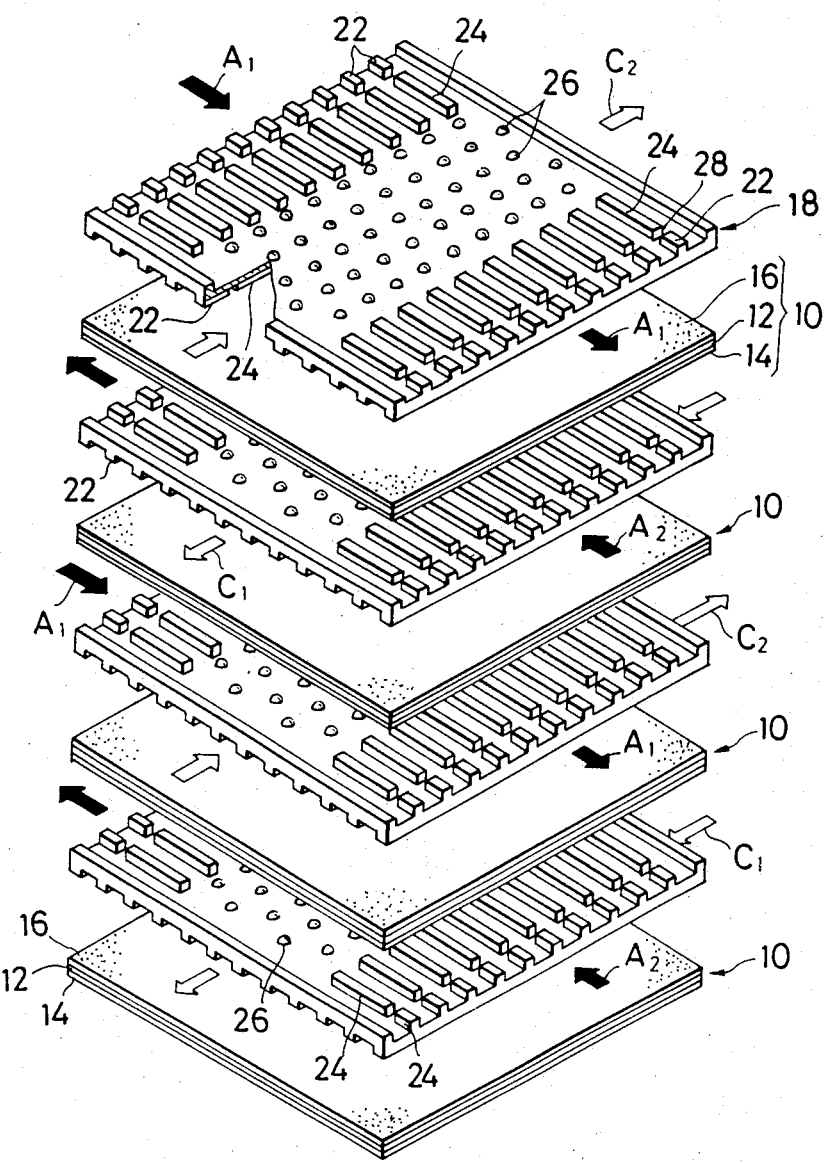
FIG. 8 is a perspective view illustrating a fundamental construction for assembling of the fuel cell according to another embodiment of the present invention and FIG. 9 is a partially-cut perspective view of the fuel cell of FIG. 8.

FIG. 10 shows temperature profile of a fuel cell of conventional structure: the cathode side gas C1 and C2 flow in the same direction ("co-flow" type) for comparison with FIG. 8. In FIG. 10, the gas temperature at the entrance is about 550° C. and that at the exit is about 700° C. so that the profile has a large undulation of approximately 150° C.

FIG. 8 illustrates a basic construction of another embodiment of the present invention. A major feature of this illustrated embodiment lies in the way the fuel gas and the oxidant gas flow in, i. e., the fuel gas and the oxidant gas flow perpendicularly to each other along the upper face and the lower face of the separator plate 18 respectively. Fundamental structure of the fuel cell of this embodiment is idential to that illustrated in FIG. 1 and like numerals are assinged to like components in both figures, so that explanation about those components are omitted.

In this particular embodiment, the projecting fins 22 and 24 of the cathode plate 16 are laid in the direction perpendicular to those of the anode 14 so that the passages C1 and C2 on the cathode plate may cross the passages A1 and A2 on the anode plate at right angles.

Figure 9:
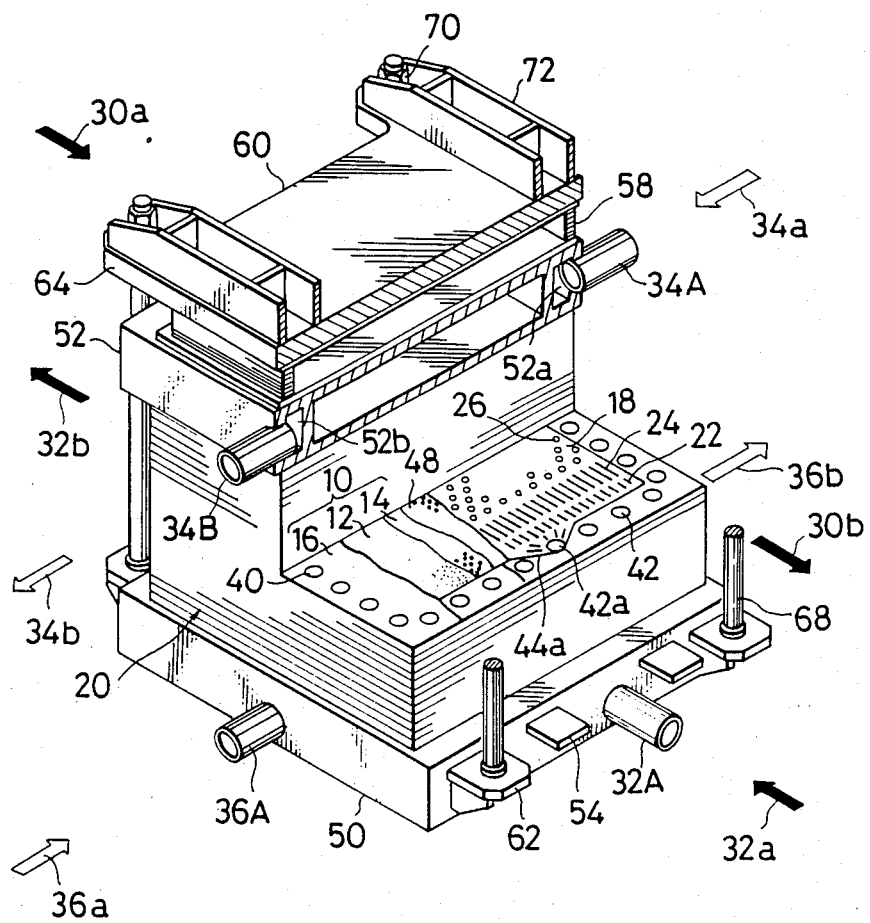

A fuel cell employing the basic structure depicted in FIG. 8 is illustrated in FIG. 9. The cell element 10 and the separator plate 18 are shaped square respectively, openings 40 and 42 are made along the periphery thereof so as to form the supply and discharge paths for the fuel gas and oxidant gas. The distributors 44 are formed at the openings 42 for respective paths of the separator plates 18.

Entrance and exit ports for the fuel gas and the oxidant gas, of which ports 32A, 34A, 36A, and 34B are visible in FIG. 9, are respectively provided to the lower holder 50 and the upper holder 52, and therefore the fuel gas and the oxidant gas enter from the entrance ports, flowing through corresponding passages 30a, 32a, 34a, 36a, 30b, 32b and 36b, and are discharged from the corresponding exit ports.

In this embodiment, although the directions of the fuel gas flow and the oxidant gas flow are orthogonal at two faces of each separator plate 18, the projecting fins 22 and 24 disposed in the gas passages function as the heat transmission assisting means, likewise as mentioned in the foregoing embodiment, thereby improving heat exhange between the fuel gas flowing along one face of the separator and the oxidant gas flowing along the other face thereof. Hence, the temperature profile of the cell element 10 possesses more gentle rise and fall.

It is recognized, of course, that those skilled in the art may make various modifications to the preferred embodiments chosed to illustrate the present invention without departing from the spirit and scope of the present contribution to the art. For example, the cathode may be attached to the the lower face of the cell element 10 and the anode may be to the upper face thereof. Also, the direction the fuel gas flows in and the locations of the openings 40 and 42 are not limited to those illustrated in the figures since the fuel gas has little influence on the temperature distribution of the cell element. Moreover, the configurations of the fins 22 an 24 are not limited to the illustrated ones, either.

What is claimed is:

1. A fuel cell comprising:
   cell elements, each cell element including an electrolyte plate, an anode plate and a cathode plate, the electrolyte plate being sandwiched by the anode plate and he cathode plate; and
   separator plates, each separator plate possessing passages formed on the front and back faces thereof so as to supply fuel gas to the anode plate of a cell element and to supply gaseous oxidizer to the cathode plate of an adjacent cell element, the cell elements and the separator plates being piled up one after the other, creating plural stages, characterized in that said fuel cell further comprises:

anode side gas supply means for supplying the fuel gas to fuel gas passages formed on one face of the separator plate;

cathode side gas supplY means for supplying the gaseous oxidizer to the oxidizer passages formed on the other face of the separator plate in a manner such that the oxidizer gas supplied to one separator plate may flow in the direction opposite to the oxidizer gas supplied to adjacent separator; and heat transfer assisting means formed on the front and back faces of each separator plate so as to assist heat transfer in the direction the separator plates and the cell elements are piled up.

2. A fuel cell of claim wherein the electrolyte plate is made from fused carbonate.

3. A fuel cell of claim 1, herein the anode side gas supply and discharge means of one separator plate supplies the fuel gas in the direction parallel to the oxidizer gas supplied from the cathode gas supply and discharge means of the next separator plate with respect to one cell element between those separator plates.

4. A fuel cell claim 1, wherein the the heat transfer assisting means are provided at the entrance and the exit of the fuel and oxidizer gas passages on the front nd back faces of the separator plates.

5. A fuel cell of claim wherein the the heat transfer assisting means are a plurality of fins formed near he entrance and the exit of the fuel and oxidizer gas passages on the front and back faces of the separator plates.

6. A fuel cell of claim 1, wherein the heat transfer assisting means are a plurality of fins formed near the entrance and the exit of the fuel and oxidizer gas passages on the front and back faces of the separator plates, and projections provided between those fins.

7. A fuel cell of claim 5, wherein the fins are arranged like parallel rows in the direction the gas flows in.

8. A fuel cell of claim 4, wherein the fins are arranged so as to contact with the anode or the cathode which faces the fins in the direction in which the cell elements and the separator plates are piled up one after the other.

9. A fuel cell comprising:

cell elements, each cell element including an electrolyte plate which is sandwiched by an anode plate and a cathode plate; and separator plates, each separator plate possessing passages formed on the front and back faces of the separator plates so as to supply fuel to the anode plate of a cell element and to supply oxidizer gas to the cathode plate of an adjacent cell element, the cell elements and the separator plates being piled up one after the other, creating plural stages, characterized in that the separator plates are formed such that each separator plate forms the fuel gas passage between one face thereof and the cell element facing said one face, and forms the oxidizer gas passage between the other face thereof and another cell element facing said the other face;

a plurality of openings are formed along both lateral sides of the cell elements as well as the separator plates in a manner such that these openings may form paths for supplying and discharging the fuel gas and the oxidizer gas when the cell elements and the separator plates are stacked;

anode side distributors are provided in the vicinity of the openings which serve as the entrance and the exit of the fuel gas passages;

cathode side distributors are provided in the vicinity of the openings which serve as the entrance and the exit of the oxidizer gas passages in such fashion that the oxidizer gas flows through one separator plate in the direction opposite to the oxidizer gas flowing through the next separator plate;

heat transfer assisting means formed in the passages on the front and back faces of each separator plate so as to assist heat propagation in the direction the separator plates and the the cell elements are stacked;

holding means for clamping the stacked cell elements and the separator plates; and means provided to the holding means and connected to the fuel gas passages and the oxidizer gas passages respectively, so as to supply the fuel gas and the oxidizer gas to the passages respectively and discharge the same from the passages.

10. A fuel cell of claim 9, wherein the electrolyte of the cell element is made from fused carbonate.

11. A fuel cell of claim 9, wherein the heat transfer assisting means are formed in the vicinity of the entrance and the exit of the fuel and oxidizer gas passages on the front and back faces of the separator plate.

12. A fuel cell of claim 9, wherein the heat transfer assisting means are a plurality of fins formed near the entrance and the exit of the fuel and oxidizer gas passages on the front and back faces of the separator plates.

13. A fuel cell of claim 9, wherein the heat transfer assisting means are a plurality of fins formed near the entrance and the exit of the fuel and oxidant gas passages on the front and back faces of the separator plates, and projections provided between those fins.

14. A fuel cell of claim 12, wherein the fins are arranged like parallel rows in the direction the gas flows in.

15. A fuel cell of claim 9, wherein each separator plate is provided with perforated plates on the front and back faces thereof so as to respectively contact with the neighbor cell elements facing said front and back faces, and sealing frames, each of which sealing frames being provided to the perforated plate such that it surrounds the perforated plate and that it secures the seal with the cell elemtent when piled up one after the other.

16. A fuel cell of claim 15, wherein the heat transfer assisting means contact with the cell element via the perforated plate.

17. A fuel cell of claim 15, wherein the heat transfer assisting means are plural fins formed in the vicinity of the entrance and the exit of the fuel gas passage and tho oxidant gas passages on the front and the back faces of the separator plates, and the plural fins formed on one face of the separator plate contact with the anode plate of a neighbor cell element via the perforated plate and the fins formed on the other face contact with the cathode plate of the other neighbor cell element via another perforated plate.

18. A fuel cell of claim 9, wherein the cell elements are stacked with all the anode plates being directed in a predetermined direction while all the cathode plates in the direction opposite to the anode plates, and terminals for taking out electric current are respectively provided to the holder means disposed at both ends of the fuel cell.

19. A fuel cell comprising:
cell elements, each cell element including an electrolyte plate, and an anode plate and a cathode plate, the electrolyte plate being sandwiched by an anode plate and a cathode plate; and
separator plates, each separator plate possessing passages formed on then front and back faces of the cell elements so as to supply fuel gas to the anode plate of a cell element and to supply oxidant gas to the cathode plate of an adjacent cell element,
the cell elements and the separator plates being piled up one after the other, creating plural stages,
characterized in that said fuel cell further comprises:
cathode side gas supply and discharge means for supplying and discharging oxidizer gas such that the oxidizer gas supplied through one separator plate may flow in the direction opposite to the oxidizer gas supplied to the adjacent separator plate;
anode side gas supply and discharge means for supplying and discharging fuel gas such that the fuel gas supplied through one separator plate may flow in the direction perpendicular to the fuel gas supplied to the adjacent separator plate; and
heat transmission assisting means formed on the front and back faces of each separator plate so as to assist heat propagation in the direction the cell elements and the separator plates are stacked.

20. A fuel cell of claim 19, wherein the electrolyte of the cell element is made from fused carbonate.

21. A fuel cell of claim 19 wherein the heat transfer assisting means are formed in the vicinity of the entrance and the exit of the fuel and oxidizer gas passages on the front and back faces of the separator plate.

22. A fuel cell of claim 19 wherein the heat transfer assisting means are a plurality of fins formed near the entrance and the exit of the fuel and oxidant gas passages on the front and back faces of each separator plate such that the fins formed on the front face extend perpendicularly relative to the fins on the back face.

23. A fuel cell of claim 19, wherein the heat transfer assisting means includes a plurality of fins formed near the entrance and the exit of the fuel and oxidizer gas passages on the front and back faces of the separator plates such that the fins formed on the front face extend perpendicularly relative to the fins on the back face and projections provided on the separator plate between those fins.

24. A fuel cell of claim 22, wherein the fins on each face of the separator plate are arranged like parallel rows.

25. A fuel cell of claim 22, wherein fins of one face of the separator plate contact with the anode plate facing said one face, and fins of the other face contact with the cathode plate facing said the other face.

26. A fuel cell comprising:
cell elements, each cell element including an electrolyte plate which is sandwiched by an anode plate and a cathode plate; and
separator plates, each separator plate possessing passages formed on the front and back faces of the separator plates so as to supply fuel gas to the anode plates of a cell element and to supply oxidizer gas to the cathode plate of an adjacent cell element,
the cell elements and the separator plates being piled up one after the other creating plural stages,
characterized in that
the separator plates are formed such that each separator plate forms the fuel gas passages between one face thereof and the cell element facing said one face and forms the oxidizer gas passages between the other face thereof and another cell element facing said the other face;
a plurality of openings are formed with predetermined intervals along the periphery of each cell element as well as each separator plate in a manner such that the openings may form fuel gas and the oxidizer gas paths which extend in the direction the cell elements and the separator plates are stacked, and such that the openings bored along two opposite segments of the periphery of each cell element and separator plate serve as a part of the oxidizer gas path while the openings bored along the other two opposite segments of the periphery of the same serve as a part of the fuel gas path, so as to allow the oxidizer gas flow perpendicular to the fuel gas;
cathode side distributors are provided in the vicinity of the openings which serve as the entrance and the exit of the passages for the oxidizer gas in such fashion that the oxidizer gas supplied to one separator plate may flow in the direction opposite to the oxidizer gas supplied to the next separator plate;
anode side distributors are provided in the vicinity of the openings which serve as the entrance and the exit of the fuel gas passages so as to distribute the fuel gas to the groups of fuel gas passages of each face of the separator plate;
heat transfer assisting means formed in the passages on both faces of each separator plate so as to assist heat propagation in the direction the cell elements and the separator plates are stacked;
holding means for clamping the stacked fuel elements and the separator plates; and
means provided to the holding means and connected to the fuel gas passages and the oxidizer gas passages, so as to supply the fuel gas and the oxidizer as to the passages respectively and to discharge the same from those passages.

27. A fuel cell of claim 26, wherein the electrolyte of the cell element is made from fused carbonate.

28. A fuel cell of claim 26, wherein the heat transfer assisting means are formed in the vicinity of the entrance and the exit of the fuel gas passages and the oxidizer gas passages on the front and back faces of the separator plate respectively.

29. A fuel cell of claim 26, wherein the heat transfer assisting means includes a plurality of fins formed near the entrance and the exit of the fuel and oxidizer gas passages on the front and back faces of the separator plates respectively.

30. A fuel cell of claim 26, wherein the heat transfer assisting means includes a plurality of fins formed near the entrance and the exit of the fuel and oxidizer gas passages on the front and back faces of the separator plates, and projections formed on the separator plate between those fins.

31. A fuel cell of claim 29, wherein the fins are arranged like parallel rows on each face of the separator plate in the direction the gas flows in.

32. A fuel cell of claim 26, wherein each separator plate is provided with perforated plates on the front and hack faces thereof so that each face of the separator plate contacts with the neighboring cell elements facing each face of the separator plate, and sealing frames each of which sealing frames being provided to the perforated plate such that it surrounds the perforated plate and that it secures the sealing with the cell elemtent when the cell elements and the separator plates are piled up one after the other.

33. A fuel cell of claim 32, wherein the heat transfer assisting means contact with the cell element via the perforated plate.

34. A fuel cell of claim 26, wherein the heat transfer assisting means are plural fins formed in the vicinity of the entrances and the exits of the fuel gas passages and the oxidizer gas passages of each separator plate, and the plural fins formed on one face of the separator plate contact with the anode plate of a neighboring cell element via the perforated plate and the fins formed on the other face contact with the cathode plate of the other neighboring cell element via another perforated plate.

35. A fuel cell of claim 26, wherein the cell elements are stacked with all the anode plates being directed in a predetermined one direction while all the cathode plates in the direction opposite to the anode plates, and terminals for taking out electric current are respectively provided to the holder means disposed at both ends of the fuel cell.

36. A method of ameliorating temperature distribution of a cell element for a fuel cell,
the fuel cell including;
cell elements, each cell element including an electrolyte plate which is sandwiched by an anode plate and a cathode plate; and
separator plates, each separator plate possessing passages formed on the front and back faces of the cell elements so as o supply fuel gas to the anode plate of a cell element and to supply oxidant gas to the cathode plate of an adjacent cell element,
the cell elements and the separator plates being piled up one after the other, creating plural stages,
characterized in that said method comprising the steps of:
supplying the fuel gas to the fuel gas passages on one face of each separator plate, and discharging the same from the fuel gas passages;
forming heat transfer assisting means on both faces of each separator plate;
supplying the gaseous oxidizer to the oxidizer passages on the other face of each separator plate, and discharging the same from the oxidizer passages in a manner such that the gaseous oxidizer supplied to one separator plate flow in the direction perpendicular to the gaseous oxidizer supplied to the next separator plate; and
transmitting heat through the heat transfer assisting means between the gaseous oxidizer supplied to adjacent separator plates in the direction the cell elements and the separator plates are piled up near the entrances and the exits of the gaseous oxidizer passages.

37. A method of claim 36, wherein the electrolyte plate is made from fused carbonate.

38. A method of claim 36, wherein the fuel gas is supplied in the counter or cross direction against the oxidizer gas with respect to one separator plate.

39. A method of claim 36, wherein the fuel gas includes hydrogen, and the oxidizer includes oxygen.

40. A method of claim 36, wherein power generation temperature is between 650° and 700° C., the oxidizer gas is supplied about 10 to 20 times as much as the fuel gas in volume.

* * * * *

UNITED STATES PATENT AND TRADEMARK OFFICE
CERTIFICATE OF CORRECTION

PATENT NO. : 4,977,041

DATED : December 11, 1990

INVENTOR(S) : Shoji Shiozawa and Toru Shimizu

It is certified that error appears in the above-identified patent and that said Letters Patent is hereby corrected as shown below:

Column 7 line 9  "gas supplY" it should be -- gas supply --

Column 7 line 19 "of claim wherein" it should be
-- of claim 1, wherein --

Column 7 line 21 " of claim 1, herein" it should be
-- of claim 1, wherein --

Column 7 line 27 " cell claim 1," it should be -- cell of claim 1, --

Column 7, line 29 "front nd" it should be -- front and --

Column 7 line 32 " near he" it should be -- near the --

Column 8 line 56 "and tho" it should be -- and the --

Column 10 line 41 " as to the" it should be -- gas to the --

Column 10 line 66 " hack faces " it should be -- back faces --

UNITED STATES PATENT AND TRADEMARK OFFICE
CERTIFICATE OF CORRECTION

PATENT NO. : 4,977,041

DATED : December 11, 1990

INVENTOR(S) : Shoji Shiozawa, et al.

It is certified that error appears in the above-identified patent and that said Letters Patent is hereby corrected as shown below:

Column 11 line 36, " so as o supply " should read -- so as to supply --

Signed and Sealed this

Fifteenth Day of September, 1992

*Attest:*

DOUGLAS B. COMER

*Attesting Officer*      *Acting Commissioner of Patents and Trademarks*